UNITED STATES PATENT OFFICE.

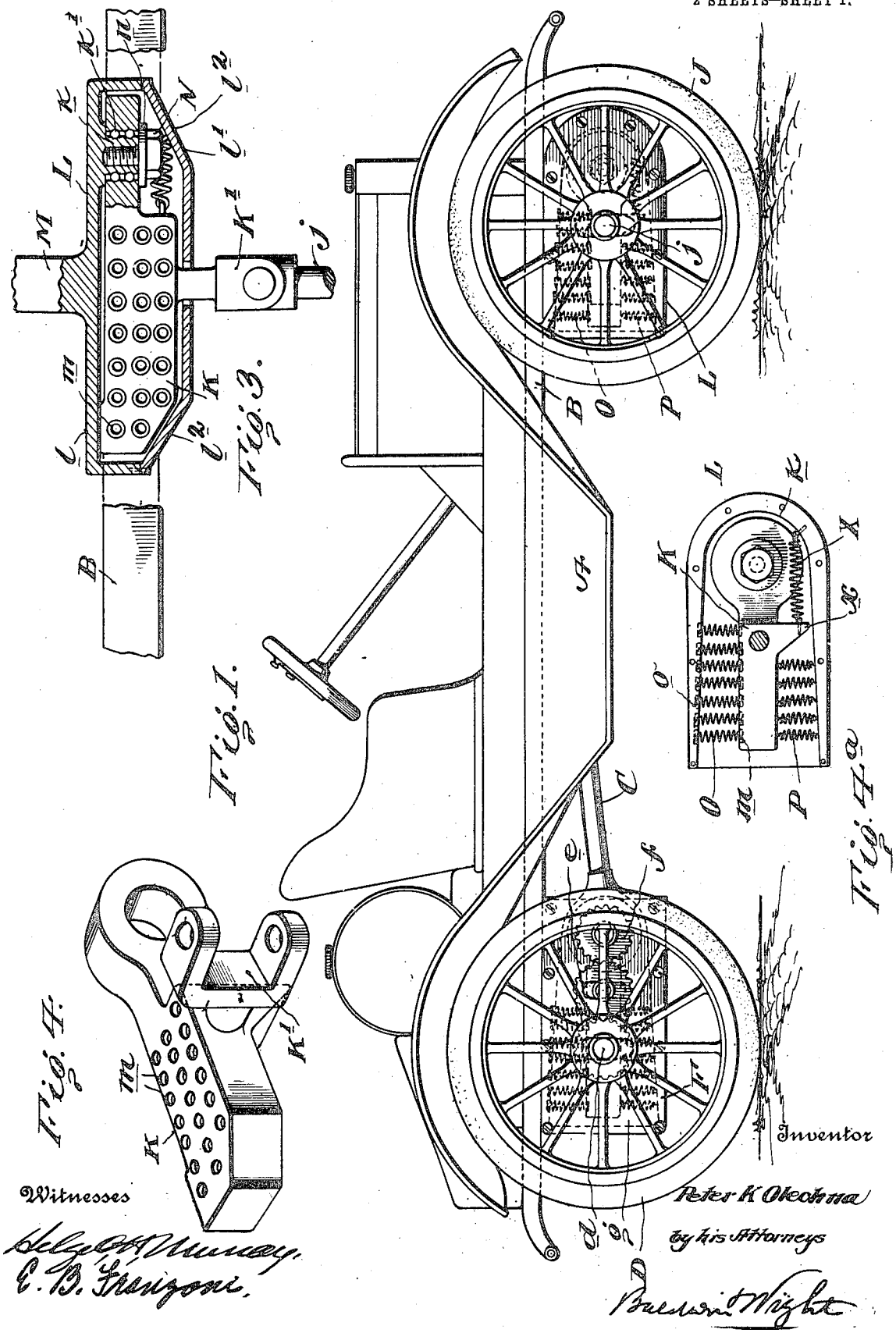

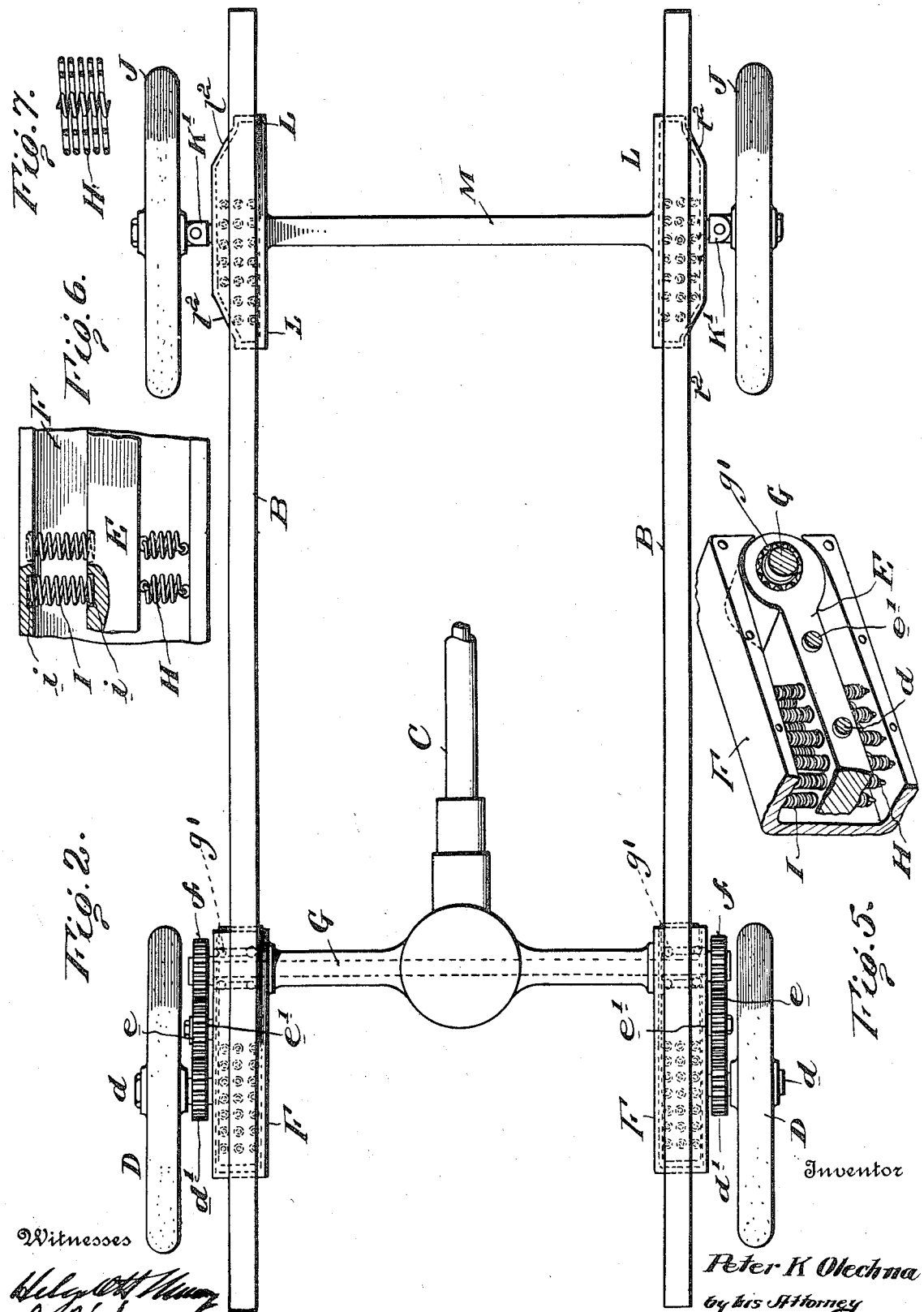

PETER K. OLECHNA, OF SCHENECTADY, NEW YORK.

VEHICLE RUNNING-GEAR.

1,069,806.

Specification of Letters Patent.  Patented Aug. 12, 1913.

Application filed January 6, 1913. Serial No. 740,466.

*To all whom it may concern:*

Be it known that I, PETER K. OLECHNA, a subject of the Emperor of Russia, (who has declared his intention of becoming a citizen of the United States,) residing in Schenectady, in the county of Schenectady and State of New York, have invented certain new and useful Improvements in Vehicle Running-Gear, of which the following is a specification.

My invention relates particularly to the running gear of automobiles and especially to that part of the running gear known as the shock absorber.

The object of my invention is to so mount the running wheels that they may be yieldingly supported in a novel way whereby the vehicle may be made easy running and comfortable.

In carrying out my invention I mount the rear wheels on stud axles, each of which is attached to a lever mounted in a suitable casing and spring supported in such manner as to normally hold it in a horizontal position. When the vehicle is occupied or loaded, the springs are put under compression or tension and when obstructions are encountered the springs cause the levers to swing with easy movement in such a way that shocks are effectually absorbed. The stud axles of the rear wheels are geared to the driving axle which may be actuated in any suitable way.

The front or steering wheels, as usual, are mounted on stub axles which are jointed to brackets projecting horizontally from levers pivotally mounted in casings attached to the under frame of the vehicle. These levers are yieldingly sustained by springs both above and below them in such manner as to cause shocks to be absorbed when obstructions are encountered.

In the accompanying drawings, Figure 1 shows a side elevation of so much of an automobile, with my improvements applied, as is necessary to illustrate my invention. Fig. 2 shows a top plan of the running gear shown in Fig. 1 with my improvements applied. Fig. 3 is a detail view on an enlarged scale partly in plan and partly in horizontal section illustrating the manner in which the front or steering wheels are connected with their shock-absorbers. Fig. 4 is a perspective view of the pivoted lever forming part of one of the shock absorbers to which the front or steering wheels are connected. Fig. 4$^a$ is a detail view of the lever shown in Fig. 4 arranged in its casing and with the front plate or cover removed. Fig. 5 is a detail view in perspective of one of the levers and certain parts connected therewith forming part of the shock absorbers for the rear wheels. Fig. 6 is another detail view showing the manner of connecting the sustaining springs to the levers. Fig. 7 is a detail view showing the manner in which concentric springs may be employed.

The body A of the vehicle may be of any suitable construction. The side bars of the under frame are indicated at B and a portion of the actuating shaft at C. The rear wheels D are each mounted on a stud axle $d$ attached to a horizontally arranged lever E within a casing F. Each stud axle $d$ carries a spur wheel $d'$ meshing with a pinion $e$ on a stud shaft $e'$ attached to the lever E and each pinion $e$ meshes with a spur wheel $f$ attached to the driving shaft G. The casings F are attached to the under frame of the vehicle and are provided with removable outer side pieces $g$ which are slotted to allow the stud axles $d$, $e'$ to move vertically. By this arrangement the motion of the driving shaft C is imparted to the wheels D. Each lever E is mounted to swing vertically to a limited extent about the axis of the driving shaft G, ball-bearings $g'$ between the lever and the shaft G being preferably provided and from this pivotal connection it extends rearwardly within the casing being supported from beneath by vertically arranged springs H which are connected to the casing and to the lever in the manner shown in Fig. 6. Any desired number of rows of springs may be employed and each spring may comprise a series of concentric springs, as indicated in Fig. 7. Above each lever is arranged a series of rows of springs I, the opposite ends of which may be seated in recesses $i$ in the lever and casing, as shown in Fig. 6 and each spring I may comprise a series of concentric springs, as shown in Fig. 7. By this arrangement the rear wheels are supported in a novel manner and shocks are effectively absorbed. It is apparent that the levers E are free to swing to a limited extent about the axis of the driving shaft G without interfering with the operation of the spur wheels and pinions and that all up and down movements of the wheels D are communicated to the body of the vehicle through the medium of the springs H and I.

The front wheels J are each mounted on a stub axle $j$ which is jointed to a bracket K' projecting from a lever K mounted to swing vertically in a casing L, each of which casings has a main portion $l$ formed preferably integrally with the front cross-piece M of the under frame of the vehicle and said casing is also provided with a removable cover $l'$. The casings are secured to the side bars B of the under frame and they are preferably inclined at $l^2$ to permit the wheels to turn to the desired extent. Each lever K is pivotally connected with a boss $k$ formed on the inside of the casing. Preferably ball bearings $k'$ are employed and the lever may be held in place by a headed bolt N and washer $n$, or in any other suitable way. The bracket K' may be formed integrally with the lever K and this lever is also formed with recesses $m$ to receive the upper compression springs O (Fig. 4$^a$), the upper ends of which rest in recesses $o$ formed in the upper part of the casing. Springs P attached to the under side of the lever K are also attached to the bottom of the casing and the springs O and P normally hold the lever in a horizontal position. Preferably also each lever K is formed with a downwardly extending arm $x$ to which is attached one or more horizontally arranged springs X connected as shown with the front walls of the casings. The levers K are adapted to move up and down against the force of the springs O, P and X and by reason of their cushioning qualities and by reason of the leverage afforded the vehicle is made very easy running and free from shocks or jolts.

I claim as my invention:

1. The combination with a vehicle frame, of a wheel, its axle, a casing attached to the vehicle frame, a horizontally arranged lever pivotally mounted within the casing and to which the wheel axle is connected and vertically arranged springs interposed between the upper and lower sides of the lever and the top and bottom walls of the casing.

2. The combination with a vehicle frame, of a wheel, its axle, a casing attached to the vehicle frame, a horizontally arranged lever pivotally mounted within the casing and which is provided with a horizontally extending bracket connected with the axle, and vertically arranged springs interposed between the upper and lower sides of the lever and the top and bottom walls of the casing.

3. The combination with a vehicle frame of a casing attached to said frame formed with a laterally projecting boss, a horizontally arranged lever having anti-friction bearings on said boss and formed with a horizontally projecting bracket, a wheel and axle connected with said bracket, and vertically arranged springs interposed between the upper and lower sides of the lever and the top and bottom walls of the casing.

4. The combination with a vehicle frame of a casing attached to said frame, a horizontally arranged lever pivotally mounted within the casing and having a downwardly projecting arm, springs interposed between the upper and lower sides of the lever and the top and bottom walls of the casing, and a horizontally arranged spring between said downwardly projecting arm and the front wall of the casing.

5. The combination with the front cross piece M, of a casing formed integrally therewith, a cover for the casing having inclined corners ($l^2$) and provided with a vertical slot, a horizontally arranged lever pivotally mounted within the casing and having a horizontally arranged bracket extending through the slot in the cover, compression springs interposed between the upper side of the lever and the top wall of the casing and extension springs attached to the lower side of the lever and to the bottom wall of the casing.

In testimony whereof, I have hereunto subscribed my name.

PETER K. OLECHNA.

Witnesses:
W. R. GRODKIEWIEZ,
JOSEF BEJGROWICZ.